United States Patent [19]
Kim

[11] Patent Number: 5,966,383
[45] Date of Patent: Oct. 12, 1999

[54] DATA COMMUNICATION SYSTEM USING A TIME SLOT INTERFACE ARCHITECTURE BETWEEN PROCESSOR AND DEVICES THEREIN

[75] Inventor: Jae-Peoung Kim, Incheon, Rep. of Korea

[73] Assignee: Daewood Telecom Ltd., Incheon, Rep. of Korea

[21] Appl. No.: 08/882,537

[22] Filed: Jun. 25, 1997

[30] Foreign Application Priority Data

Jun. 26, 1996 [KR] Rep. of Korea ............ 96-24059
Jun. 26, 1996 [KR] Rep. of Korea ............ 96-24060

[51] Int. Cl.[6] ............................................. H04B 7/212
[52] U.S. Cl. ..................... 370/442; 370/437; 370/443; 370/458
[58] Field of Search ......................... 370/216, 217, 370/219, 220, 227, 228, 442, 535, 458, 321, 314, 337, 336, 347, 360, 402, 468, 294, 340, 345, 372, 375, 420, 437, 439, 443; 395/800.01, 882, 828, 821, 297, 304

[56] References Cited

U.S. PATENT DOCUMENTS 4,172,214  10/1979  McDonald et al. ............ 370/372
5,357,360  10/1994  Imhoff et al. .................. 359/125
5,490,252   2/1996  Macera et al. ................. 370/402
5,596,569   1/1997  Madonna et al. .............. 370/217
5,661,726   8/1997  Wilder et al. .................. 370/458

*Primary Examiner*—Dang Ton
*Assistant Examiner*—Phirin Sam
*Attorney, Agent, or Firm*—Pennie & Edmonds LLP

[57] ABSTRACT

A data communications system comprises a bus for transferring data, a plurality of devices sharing the bus by time-division multiplexing, wherein time is divided into time slots and a frame is assembled with a predetermined number of time slots, a processor for assigning to each of the devices time slots and for multiplexing data to be transferred to each of the devices into a data frame TXD and demultiplexing a data frame RXD including data transferred from each of the devices, wherein data transmission between the processor and each of the devices is performed during the time slots assigned to each of the devices, and an interfacing module, coupled with the processor and each of the devices, for multiplexing data transmitted from each of the devices to transfer to the processor.

13 Claims, 2 Drawing Sheets

DATA COMMUNICATION SYSTEM USING A TIME SLOT INTERFACE ARCHITECTURE BETWEEN PROCESSOR AND DEVICES THEREIN

FIELD OF THE INVENTION

The present invention relates to a data communications system; and, more particularly, to a data communications system using a time slot interface architecture between processor and a plurality of devices.

BACKGROUND OF THE INVENTION

In an electronic switching system (ESS) comprising a large number of processors, use of a hierarchical processor architecture is gaining popularity. For example, an access switching subsystem performing such functions as scanning, interfacing and time switching, included in the ESS, has the hierarchical processor architecture. In the hierarchical processor architecture, the functions of processors are divided into, e.g., two hierarchies, upper and lower, wherein the upper hierarchical function is performed by main processors (MP's) and the lower hierarchical function is performed by peripheral processors (PP's).

For instance, the PP performs simple processing operations, such as supervising telephony devices, e.g., a subscriber interface device, a trunk interface device and a signaling device, and controlling system peripheral devices, e.g., a magnetic tape driver, a disk driver and a CRT (cathode-ray tube) terminal. Therefore, the scanning of the subscriber's hook-off and signal distribution function are handled by the PP. On the other hand, the MP's control a predetermined set of the PP's to perform call processing and OA&M (operation, administration and maintenance) in response to predetermined signals generated at the PP's.

As described, it is necessary to provide a data communications path between the PP and each of the devices. In the known ESS, for data transmission the PP is connected to each of the devices by using a conventional bus architecture and a predetermined bus access process. The conventional bus architecture includes lines for an address, data, a bus clock.

However, in using the conventional bus architecture, the bus clock frequency does not guarantee the speed of data transmission. In other words, the speed of data transmission between the PP and each of the devices is lower than the bus clock frequency since it takes a predetermined period of the bus clock to perform operations required at every access, such as a bus arbitration operation for the bus access and data transfer operation. For example, it takes 20 clock periods to get the bus access and transfer data when the bus clock frequency is 2.5 MHz. Therefore, for a device requiring high speed data transmission, it is necessary to increase the bus clock frequency.

At high frequencies, impedance matching is critical since the bus has the character of a transmission line. Since it is difficult to do an exact impedance matching for the bus, resulting in such a high transmission loss of the bus, the length of the bus cable is severely limited at high frequency. Subsequently, the number of the devices connected to the PP is substantially restricted.

SUMMARY OF THE INVENTION

It is, therefore, a primary object of the present invention to provide a data communications system capable of increasing the speed of data transmission between the PP and each of the devices in the system up to the bus clock frequency, by varying the number of time slots in a frame assigned to each of the devices, wherein time is divided into the time slots and a predetermined number of time slots are assembled in a frame.

In accordance with the present invention, there is provided a data communication system comprising:

a bus for transferring data;

a plurality of devices sharing the bus by time-division multiplexing, wherein time is divided into time slots and a frame is assembled with a predetermined number of time slots;

a processor for assigning to each of the devices time slots and for multiplexing data to be transferred to each of the devices into a data frame TXD and demultiplexing a data frame RXD including data transferred from each of the devices, wherein data transmission between the processor and each of the devices is performed during the time slots assigned to each of the devices; and an interfacing module coupled with the processor and each of the devices, for multiplexing data transmitted from each of the devices to transfer to the processor.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
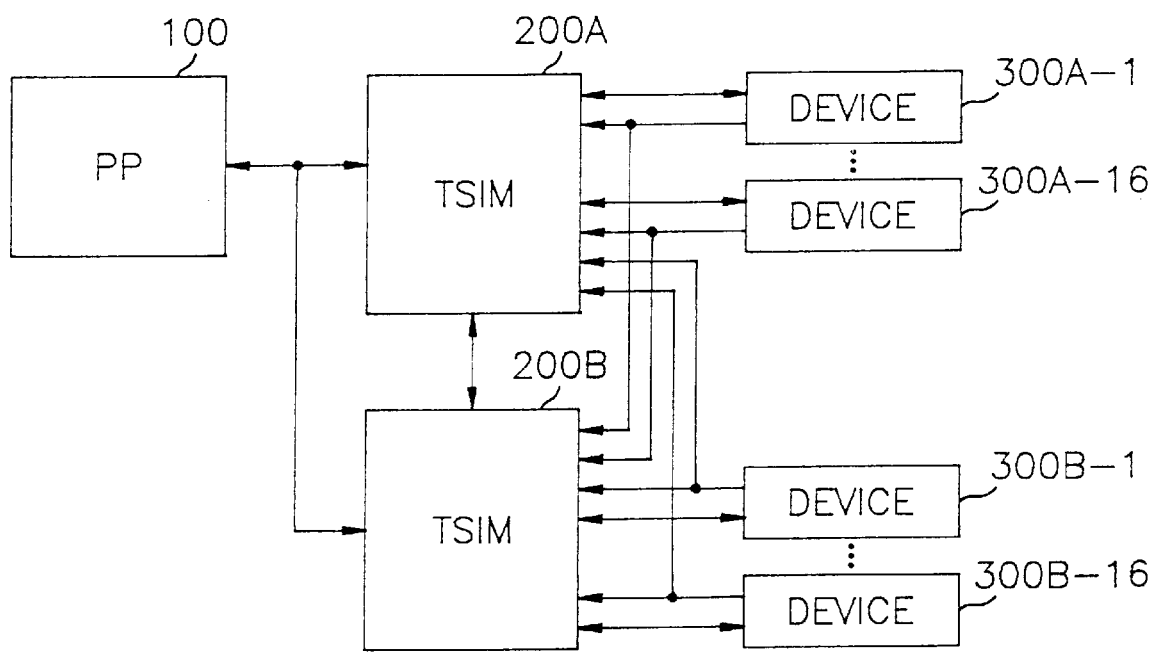
FIG. 1 shows a block diagram illustrating a data communications system using a time slot interface architecture in accordance with the invention.

Referring to FIG. 1, there is provided a block diagram illustrating a data communications system, e.g., an access switching subsystem (ASS) of an ESS, using a time slot interface architecture in accordance with the invention.

The ASS includes a PP 100, a time slot interface module (TSIM) 200A and its redundancy TSIM 200B, and n devices, n being assumed to be 16 for the sake of simplicity hereinafter, i.e., 16 devices, 300A-1 to 300A-16 and their n redundancy devices, e.g., 16 of them, 300B-1 to 300B-16, as shown in FIG. 1. For the reliability of the system, there are generally incorporated two identical TSIM's instead of one. In FIG. 1, the TSIM 200B is identical to the TSIM 200A, and also, the devices 300B-1 to 300B-16 are identical to the corresponding devices 300A-1 to 300A-16, respectively.

The TSIM's 200A and 200B are operated in an active/standby mode. In the active/stand-by mode, a current active TSIM, e.g., the TSIM 200A, provides a data communication path between the processor 100 and each of the devices 300A-1 to 300A-16 while the other stand-by TSIM, e.g., the stand-by TSIM 200B, does not provide the substantial data communications path. When the current active TSIM 200A becomes malfunctioning, the operation mode of the malfunctioning TSIM 200A and its corresponding devices 300A-1 to 300A-16 is charged to be stand-by and the operation mode of the redundancy TSIM 200B and its corresponding redundancy devices 300B-1 to 300B-16 becomes to be active, thereby guaranteeing a continuous data transmission.

The PP 100 is connected to the TSIM 200A and its redundancy TSIM 200B. In the following discussion, it is assumed that the TSIM 200A and the devices 300A-1 to 300A-16 are the current active ones. The TSIM 200A distributes data from the PP 100 to each of the devices 300A-1 to 300A-16 and consolidates data from each of the devices 300A-1 to 300A-16 to the PP 100. And also, the TSIM 200A receives alarm signals from each of the devices 300A-1 to 300A-16.

The PP 100 communicates with each of the devices 300A-1 to 300A-16 via the TSIM 200A by time-division multiplexing, wherein time is divided into time slots and a predetermined number of time slots are assembled in a frame. For example, the frame includes 32 time slots, each corresponding to a 64 Kbps channel when a clock frequency is 2.048 MHz.

The speed of data transmission between the PP 100 and each of the devices 300A-1 to 300A-16 can be changed by varying the number of channels assigned to each of the devices 300A-1 to 300A-16.

One of the devices 300A-1 to 300A-16, e.g., device 300A-1, generates an initialization message and a default channel selection (CSEL) signal when the device 300A-1 is turned on. The initialization message data includes information representing the device 300A-1 and the default CSEL signal depicts the number of channels, e.g., 2 channels, being used between the PP 100 and the TSIM 200A for data transmission to/from the device 300A-1. The initialization message data and the CSEL signal are transferred to the TSIM 200A.

At the TSIM 200A, the initialization message data and the CSEL signal indicate which time slots, e.g., 0th and 1st time slots in the frame, are assigned to the device 300A-1. For example, the time slots are determined by a port of the TSIM 200A, wherein the TSIM 200A has 16 ports (not shown), each of the ports is coupled to each of the devices 300A-1 to 300A-16. In the 0th and 1st time slots, the initialization data from the device 300A-1 is transferred from the TSIM 200A to the PP 100.

At the PP 100, assignment message data includes information assigning more than 2 time slots, e.g, 4 time slots, to the device 300A-1, if the device 300A-1 is one of the devices which require 256 Kbps data transmission instead of 128 Kbps and also if there are idle time slots available in the frame. The assignment message data is transferred to the TSIM 200A in the 0th and 1st time slots.

The TSIM 200A generates a start channel (SC) signal to depict that a starting time slot for the device 300A-1 is 0th time slot. The frame, including the assignment message data for the device 300A-1 in the 0th and 1st time slots, is broadcast to all of the devices 300A-1 to 300A-16 and the SC signal is outputted to the device 300A-1.

The device 300A-1 is capable of reading data in the 0th and 1st time slots since 2 channels are assigned originally and the SC signal depicts that the starting time slot is 0th. After receiving the assignment message data, the device 300A-1 modifies the CSEL signal thereby depicting that 4 channels are assigned for the device 300A-1. The device 300A-1 transmits its data for the PP 100 and the CSEL signal to the TSIM 100.

Receiving the CSEL signal, the TSIM 200A further assigns 2 time slots, e.g., 2nd and 3rd time slots, to the device 300A-1. The data from the device 300A-1 is transferred during the 0th to 3rd time slots to the PP 100, and also, data from the PP 100 to the device 300A-1 during the same 0th to 3rd time slots. Therefore, the speed of the data transmission between the PP 100 and the device 300A-1 becomes 256 Kbps instead of 128 Kbps default speed.

Further, the device 300A-1 may communicate with the PP 100 with 2.048 Mbps speed if there is no other device which is turned on.

Similarly, each of the devices 300A-2 to 300A-16 use 2 channels at first and, if necessary, more channels are assigned thereto. And, the details of the processing of the remainder of the devices 300A-2 to 300A-16 are omitted here for the sake of simplicity.

Figure 2:
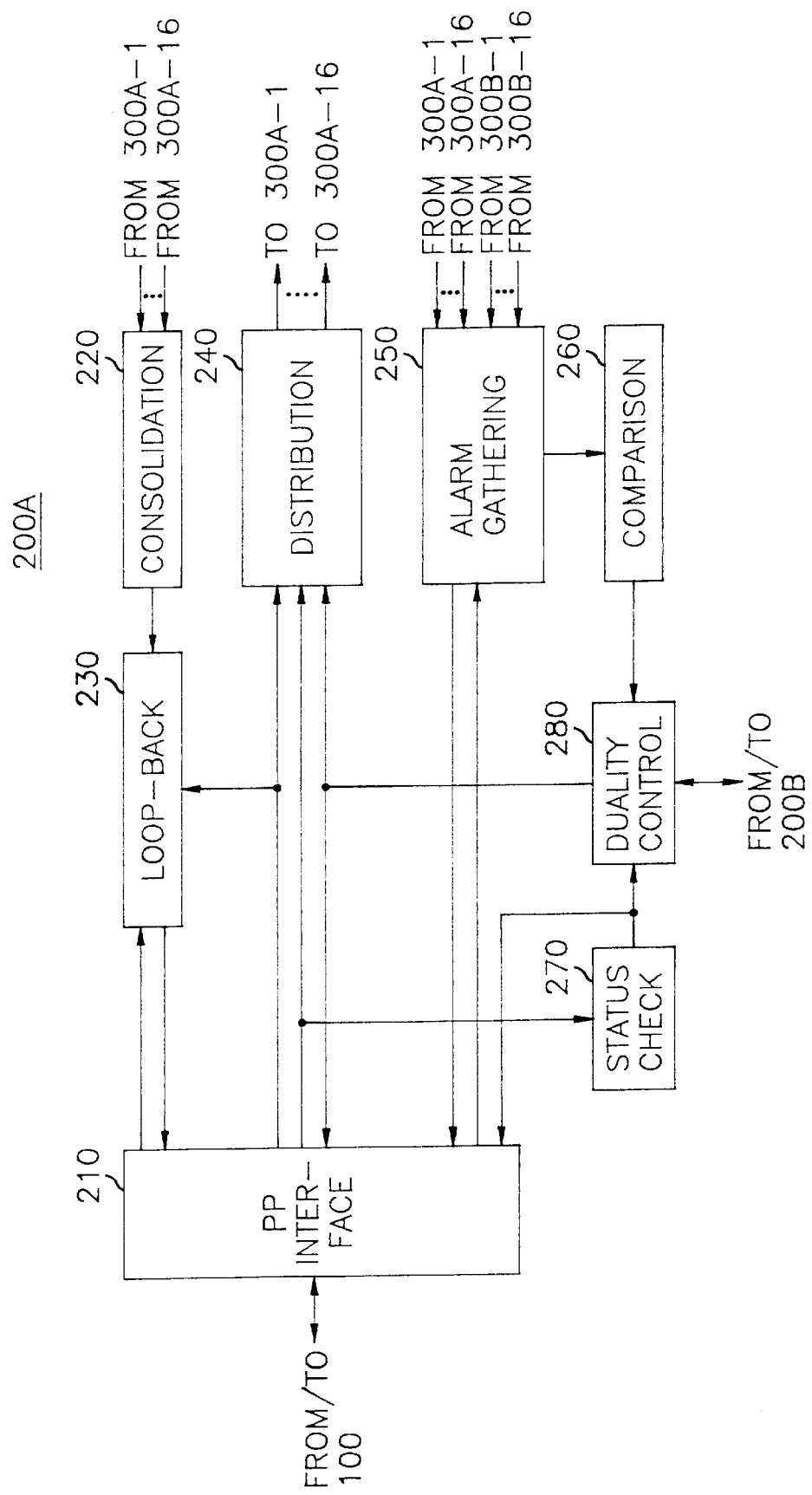
FIG. 2 presents a detailed block diagram of the time slot interfacing module in FIG. 1.

Referring now to FIG. 2, there is provided a block diagram of a preferred embodiment of the inventive TSIM 200A. The TSIM 200B is added for system reliability and substantially identical to the TSIM 200A; and, therefore, its operation and structure will not be explained here separately.

The TSIM 200A includes a PP interface block 210, a consolidation block 220, a loop-back block 230, a distribution block 240, an alarm gathering block 250, a comparison block 260, a status check block 270, and a duality control block 280.

At the PP interface block 210, signals, such as the clock (CLK) signal and mode selection (MS) signal, and the frame, from/to the PP 100, are processed by employing a conventional interfacing technique so that it can be interfaced to the PP 100 as depicted in FIG. 1.

The consolidation block 220 receives data and the CSEL signal from each of the devices 300A-1 and 300A-16, and assembles the frame to be supplied to the PP 100.

The loop-back block 230 receives the MS signal from the PP 100 via the PP interface block 210 and the frames from both the consolidation block 220 and the PP 100. At the loop-back block 230, the frame from the PP 100 is looped back to the PP 100 via the PP interface block 210 if the MS signal represents a loop-back mode, and if otherwise, the frame from the consolidation block 220 is outputted from the loop-back block 230 to the PP interface block 210.

The distribution block 240 receives the CLK signal and the frame from the PP 100 via the PP interface block 210, and generates the SC signals. For example, each of the SC signals is a pulse representing the starting time slot for each of the devices 300A-1 to 300A-16. And the CLK and the TXD are broadcast to all of the devices 300A-1 to 300A-16.

The alarm gathering block 250 generates predetermined alarm signals for each of the devices 300A-1 to 300A-16 and the devices 300B-1 to 300B-16. For example, 16 device open signals, each of them depicting that each of the device 300A-1 to 300A-16 is out of place, and 16 cable open signals, each of them depicting that the cable between the TSIM 200A and each of the devices 300A-1 to 300A-16 is out of place, are inputted to the alarm gathering block 250. And also, 16 device open signals, each of them depicting that each of the device 300B-1 to 300B-16 is out of place, and 16 cable open signals, each of them depicting that the cable between the TSIM 200A and each of the devices 300B-1 to 300B-16 is out of place, are inputted to the alarm gathering block 250. A predetermined set of the alarm signals, e.g., a set of the device open signal of the devices 300A-1 and 300A-16, selected by an alarm selection signal from the PP 100, is transferred to the PP 100 via the PP interface block 210.

The comparison block 260 is coupled to the alarm gathering block 250 to compare the number of open cables between the TSIM 200A and each of the devices 300A-1 to 300A-16 with the number of open cables between the TSIM 200B and each of the devices 300B-1 to 300B-16. When the number for the TSIM 200A is less than that for the TSIM 200B, a cable failure (CF) signal is transmitted to the duality control block 280.

The status check block 270 receives the CLK signal from the PP 100 via the PP interface block 210 and checks whether or not the CLK signal is provided to the distribution block 240 properly. For example, a function failure (FF) signal is outputted to the duality control 280 when the CLK signal does not have the frequency of 2.048 Mhz, and the FF is then transferred to the PP 100 via the PP interface block 210.

The duality control block 280 selectively outputs an active signal based on the CF signal and the FF signal. If neither the CF signal nor the FF signal is inputted to the duality control block 280, the active signal is outputted to the duality control block (not shown) of the counterpart TSIM 200B. And the duality control block 280 receives the active signal from the counterpart TSIM 200B.

While the TSIM 200A is in an active state, i.e., outputting an active state signal to its corresponding devices 300A-1 to 300A-16, the PP 100 and the counterpart TSIM 200B, the state of the TSIM 200A transits to a standby state, i.e., outputting a stand-by state signal to its corresponding devices 300A-1 to 300A-16, the PP 100 and the counterpart TSIM 200B if the CF signal and/or the FF signal are/is inputted to the duality control block 280 and the active signal is inputted from the counterpart TSIM 200B, and if, otherwise, the active state of the TSIM 200A is pertained.

On the other hand, while the TSIM 200A is in the stand-by state and the active signal is inputted from the TSIM 200B, the standby state of the TSIM 200A is pertained. Otherwise, the state of the TSIM 200A will transit to the active state.

As described above, since it is possible to increase the speed of data transmission by increasing time slots assigned to a predetermined device, it is not necessary to increase the clock frequency. Therefore, the problem of severe limitation on the bus cable length, i.e., the restriction for the number of devices being connected to the PP, will be avoided.

While the present invention has been shown and described with respect to the particular embodiments, it will be apparent to those skilled in the art that many changes and modifications may be made without departing from the spirit and scope of the invention as defined in the appended claims.

What is claimed is:

1. A time division multiplexing data communication system based on a frame including P number of time slots, the system comprising:

a bus means for transferring data;

N number of devices including turned-on devices therein, each turned-on device selecting one or more default time slots upon initiation of data communication, N being not greater than P with N being a positive integer;

a processor, communicating with each turned-on device, for determining an adaptive number of time slots to be assigned to each turned-on device based on the number of default time slots and the number of time slots not occupied by the turned-on devices, wherein the processor generates an assignment message including information assigning more than the number of default time slots; and a first interface means, coupled to the processor and the devices via the bus means, for assembling and de-assembling the frame and assigning time slots to each turned-on device based on the adaptive number thereof, wherein the first interface means generates a starting time slot signal indicating a starting time slot in response to the assignment message and wherein the first interface means includes:

a processor interface block for processing signals including a clock signal and a mode selection signal and the frame;

a consolidation block for receiving the frame and a modified time selection signal from each device;

a loop-back block for receiving the mode selection signal from the processor interface block and the frame from the processor and the consolidation block, wherein the frame received from the processor and the consolidation block is looped back to the processor if the mode selection signal indicates a loop-back mode, and if otherwise, the frame is sent to the processor interface block;

a distribution block for receiving the clock signal and the frame from the processor interface block and generating the time slot selection signal; and an alarm gathering block for generating alarm signals for each device, each alarm signal indicating whether there is an open cable, wherein each device modifies a time slot selection signal in response to the assignment message and sends the modified time slot selection signal to the first interface means.

2. The data communication system of claim 1, wherein each device generates an initialization message and a default time slot selection signal when said each device is turned on, wherein the initialization message and the default time slot selection signal indicate which time slots are assigned to said each device.

3. The data communication system of claim 2, wherein the first interface means assigns additional time slots, in response to the modified time slot selection signal.

4. The data communication system of claim 3, further comprising a second interface means for backup, one of said first and second interface means being in an active state while the other of said first and second interface means is in a stand-by state.

5. The data communication system of claim 4, wherein each device is duplicated for backup, a device connected to one of said first and second interface means being in the active state, while a corresponding device connected to the other of said first and second interface means is in the stand-by state.

6. The data communication system of claim 5 wherein each of said first and second interface means further includes:

a comparison block, coupled to the alarm gathering block, for comparing the alarm signals from each set of duplicated devices to determine whether there is a cable failure;

a status check block for receiving the clock signal from the processor interface block and checking whether the clock signal is provided to the distribution block properly; and a duality control block for generating an active signal for use in selecting which of said first and second interface means is active.

7. A data communication system employing time division multiplexing in which each data frame is divided into P number of time slots, the system comprising:

a processor;

a bus means for transferring data connected to said processor;

identical first and second interface modules, each of said interface modules connected to said processor via said bus means, said first and second interface modules having a communication link therebetween configured to signal which of the two interface modules is in an active state and which of the two interface modules is in a stand-by state at any given time;

a first set of N number of devices, each device of said first set having a data communication path to said first interface module, a second set of N number of devices, each device of said second set having a data communication path to said second interface module, with N being not greater than P and each device in both sets of N devices further configured to provide a status signal to both of said first and second interface modules, N being not greater than P; wherein each of a first number of devices in said first set specifies a default number of time slots, upon initiation of data communication;

said processor is configured to determine, for each of the first number of devices, an adaptive number of time slots based on said default number of time slots and an available number of time slots;

each of the first number of devices modifies said default number of time slots, in response to said adaptive number of time slots; and said first interface module assigns time slots to each of the first number of devices, based on said adaptive number for that device, wherein the first interface module includes:

a processor interface block for processing signals including a clock signal and a mode selection signal and a frame;

a consolidation block for receiving the frame and a modified time selection signal from said each device;

a loop-back block for receiving the mode selection signal from the processor interface block and the frame from the processor and the consolidation block, wherein the frame received from the processor and the consolidation block is looped back to the processor if the mode selection signal indicates a loop-back mode, and if otherwise, the frame is sent to the processor interface block;

a distribution block for receiving the clock signal and the frame from the processor interface block and generating the time slot selection signal; and an alarm gathering block for generating alarm signals for each device, each alarm signal indicating whether there is an open cable.

8. The data communication system of claim 7 wherein each of said interface means further includes:

a comparison block coupled to the alarm gathering block, for comparing the alarm signals from each set of devices to determine whether there is a cable failure;

a status check block for receiving the clock signal from the processor interface block and checking whether the clock signal is provided to the distribution block properly; and a duality control block for generating an active signal for use in selecting an active interface means.

9. The data communication system of claim 7, wherein each device generates an initialization message and a default time slot selection signal when said each device is turned on, wherein the initialization message and the default time slot selection signal indicate which time slots are assigned to said each device.

10. The data communication system of claim 9, wherein the processor generates an assignment message including information assigning more than the number of default time slots indicated to each device.

11. The data communication system of claim 10, wherein the first interface means generates a starting time slot signal indicating a starting time slot, in response to the assignment message.

12. The data communication system of claim 10, wherein each device modifies a time slot selection signal in response to the assignment message and sends the modified time slot selection signal to the first interface means.

13. The data communication system of claim 12, wherein the first interface means assigns additional time slots, in response to the modified time slot selection signal.

* * * * *